US009367475B2

(12) United States Patent
Ramaraju et al.

(10) Patent No.: US 9,367,475 B2
(45) Date of Patent: Jun. 14, 2016

(54) SYSTEM AND METHOD FOR CACHE ACCESS

(75) Inventors: Ravindraraj Ramaraju, Round Rock, TX (US); David R. Bearden, Austin, TX (US); Andrew C. Russell, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 727 days.

(21) Appl. No.: 13/440,728

(22) Filed: Apr. 5, 2012

(65) Prior Publication Data
US 2013/0268732 A1 Oct. 10, 2013

(51) Int. Cl.
G06F 12/00 (2006.01)
G06F 13/00 (2006.01)
G06F 12/08 (2016.01)
G06F 1/32 (2006.01)

(52) U.S. Cl.
CPC .......... *G06F 12/0895* (2013.01); *G06F 1/3225* (2013.01); *G06F 1/3275* (2013.01); *Y02B 60/1225* (2013.01); *Y02B 60/1228* (2013.01); *Y02B 60/32* (2013.01)

(58) Field of Classification Search
None
See application file for complete search history.

(56) References Cited

U.S. PATENT DOCUMENTS

| 5,754,819 | A | 5/1998 | Lynch et al. | |
|---|---|---|---|---|
| 5,757,690 | A * | 5/1998 | McMahon | G06F 8/66 365/104 |
| 5,860,151 | A * | 1/1999 | Austin et al. | 711/213 |
| 5,883,826 | A * | 3/1999 | Wendell et al. | 365/63 |
| 6,088,763 | A | 7/2000 | Silberman et al. | |
| 6,681,313 | B1 | 1/2004 | Trong et al. | |
| 6,738,890 | B2 | 5/2004 | Ishikawa et al. | |
| 7,035,127 | B1 | 4/2006 | Adams et al. | |
| 7,236,396 | B2 | 6/2007 | Houston et al. | |
| 7,286,423 | B2 | 10/2007 | Ramaraju | |
| 7,533,226 | B2 | 5/2009 | Flautner et al. | |
| 7,669,034 | B2 | 2/2010 | Bearden et al. | |
| 7,984,229 | B2 | 7/2011 | Ramaraju et al. | |
| 2002/0015349 | A1* | 2/2002 | Matsui | G11C 7/1048 365/227 |
| 2003/0028749 | A1* | 2/2003 | Ishikawa et al. | 711/220 |
| 2007/0028051 | A1* | 2/2007 | Williamson et al. | 711/128 |
| 2007/0094479 | A1* | 4/2007 | Bearden et al. | 711/220 |
| 2007/0094480 | A1* | 4/2007 | Ramaraju et al. | 711/220 |
| 2008/0120514 | A1* | 5/2008 | Ismail et al. | 713/324 |

(Continued)

OTHER PUBLICATIONS

Austin, T. et al., "Streamlining Data Cache Access with Fast Address Calculation," IEEE Proceedings of the 22nd Annual International Symposium on Computer Architecture, Jun. 22-24, 1995, ISBN: 0-89791-698-0, 12 pages.

(Continued)

*Primary Examiner* — Sean D Rossiter

(57) ABSTRACT

The rows of a cache are generally maintained in a low power state. In response to a memory access operation, the data processor predicts a plurality of cache rows that may be targeted by the operation, and transitions each of the plurality of cache rows to an active state to prepare them for access. The plurality of cache rows are predicted based on speculatively decoding a portion of a base address and a corresponding portion of an offset without performing a full addition of the portions. Because a full addition is not performed, the speculative decoding can be performed at sufficient speed to allow the set of rows to be transitioned to the active state before full decoding of the memory address is completed. The cache row associated with the memory address is therefore ready for access when decoding is complete, maintaining low latency for cache accesses.

18 Claims, 4 Drawing Sheets

(56) References Cited

U.S. PATENT DOCUMENTS

2010/0306302 A1    12/2010    Ramaraju et al.
2010/0312957 A1    12/2010    Ramaraju et al.

OTHER PUBLICATIONS

Cortadella, J. et al., "Evaluation of A + B = K Conditions Without Carry Propagation," IEEE Transactions on Computers, vol. 41, No. 11, Nov. 1992, pp. 1484-1488.

Heald, R. et al., "64 kB Sum-addressed-memory Cache with 1.6 ns Cycle and 2.6 ns Latency," 1998 IEEE International Conference on Solid-State Circuits, vol. 33, No. 11; Nov. 1998, pp. 1682-1689.

Juan, T. et al., "Reducing TLB Power Requirements," IEEE International Symposium on Low Power Electronics and Design, Aug. 18-20, 1997, pp. 196-201.

\* cited by examiner

SYSTEM AND METHOD FOR CACHE ACCESS

FIELD OF THE DISCLOSURE

The present disclosure relates generally to data processors, and more particularly to cache access for data processors.

BACKGROUND

A data processor typically employs a cache for storage and retrieval of recently accessed information. The performance of the data processor is impacted by the speed at which the cache responds to access requests. Cache responsiveness can be improved by maintaining the cache in an active state, whereby a relatively high voltage is applied to the voltage references of the cache's bit cells. However, maintaining the cache in the active state can consume a large amount of power.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-4 illustrate techniques for reducing the power consumption of a cache while maintaining low cache access latency. The rows of the cache are generally maintained in a low power state. In response to a memory access operation, the data processor predicts a plurality of cache rows that may be targeted by the operation, and transitions each of the plurality of cache rows to an active state to prepare them for access. The plurality of cache rows are predicted based on speculatively decoding a portion of a base address and a corresponding portion of an offset without performing a full addition of the portions. Because a full addition is not performed, the speculative decoding can be performed at sufficient speed to allow the set of rows to be transitioned to the active state before decoding of the memory address is completed. The cache row associated with the memory address is therefore ready for access when decoding is complete, maintaining low latency for cache accesses.

Figure 1:
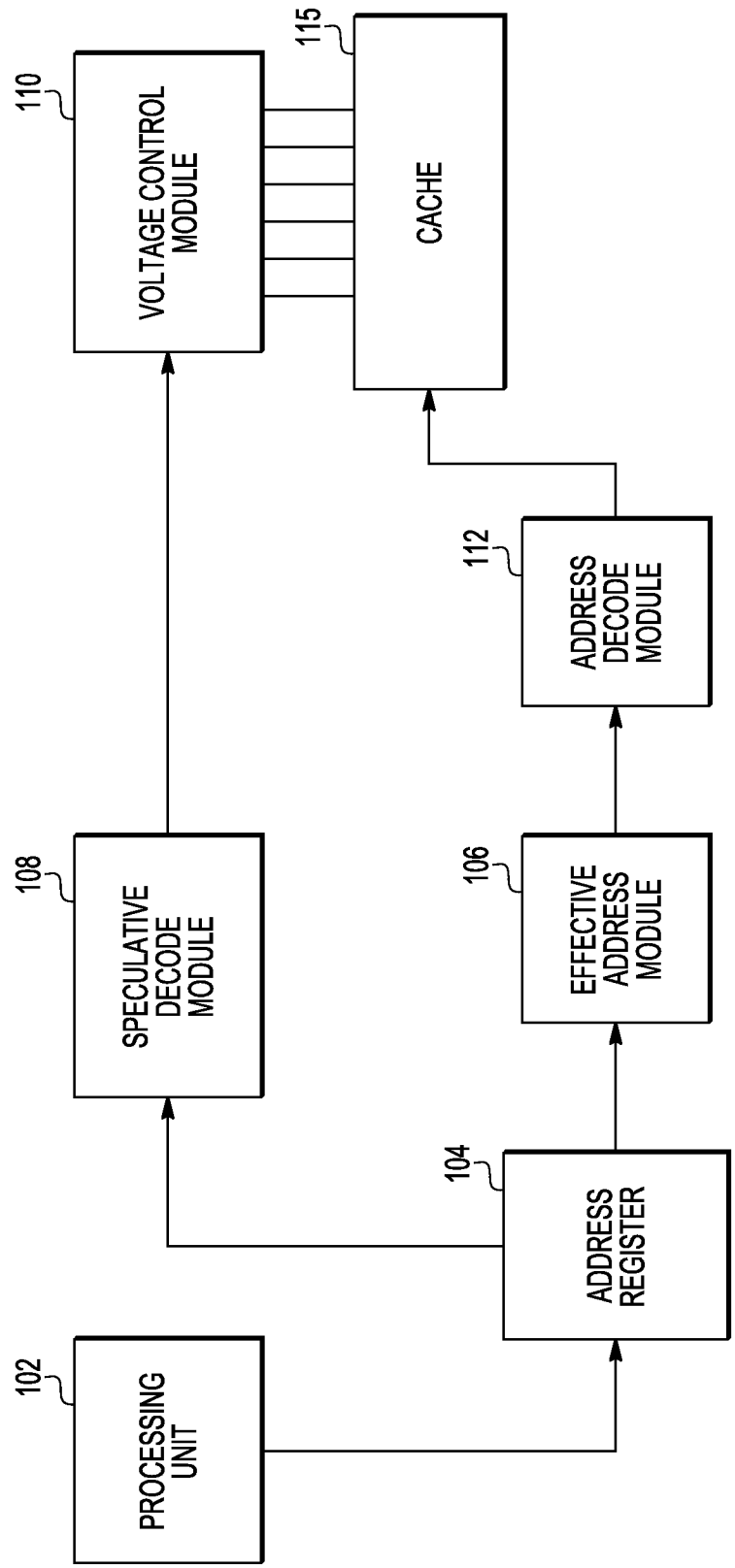
FIG. 1 is a block diagram illustrating a portion of a data processor in accordance with a specific embodiment of the present disclosure.

FIG. 1 illustrates a portion of data processor 100 in accordance with one embodiment of the present disclosure. In the illustrated example, the data processor 100 includes a processing unit 102, an address register 104, an effective address module 106, a speculative decode module 108, a voltage control module 110, an address decode module 112 and a cache 115. The processing unit 102 is connected to the address register 104, which is also connected to the speculative decode module 108 and the effective address module 106. The voltage control module 110 is connected to the speculative decode module 108 and the cache 115. The address decode module 112 is connected to the cache 115.

The processing unit 102 is configured to execute sets of instructions in order to carry out designated tasks. In the course of executing instructions, the processing unit 102 can generate load and store operations to transfer data from and to memory. The load and store operations are collectively referred to as memory access operations. Each memory access operation targets a memory location associated with a memory address.

The memory address of a memory access can be associated with an effective address used to access caches, translation look aside buffers, and the like. Accordingly, a memory access operation can include or refer to two operands used to compute the effective address: a base address and an offset. As described further herein, for each memory access operation the effective address is calculated by adding together the base address and the offset. The effective address is then used to determine the cache line of cache 115 that stores data associated with the memory address.

A memory access operation is initiated by storing the base address and offset value operands in address register 104. In particular, address register 104 can include two portions, with one of the portions designated for storing the base address and another portion storing the offset value. In other embodiments, the operands can be stored in separate registers.

The effective address module 106 is configured to retrieve the base address and offset values stored in address register 104, and to calculate the effective address for the operation based on these received operand values. In particular, the effective address module 106 calculates the effective address by adding the offset value to the base address. Accordingly, the effective address module can include one or more adders and other logic configured to compute the effective address.

In one embodiment, the effective address module 106 can reduce computation overhead and latency by employing only a selected portion of the sum of the base address and offset values as the effective address. For example, the sum of the base address and offset values can be a 64-bit number, with the effective address corresponding to only bits 52-57 of the 64-bit number.

The address decode module 112 determines a decoded address value based on a received effective address. The decoded address value indicates a particular row of the cache 115 that stores data associated with the effective address. In one embodiment, the received effective address is a 64 bit number where bit 0 is the MSB and bit 63 is the LSB. Bits 52-57 of the effective address are decoded by decode module 112 for selecting 1 of 64 rows for access in cache 115. As described further herein with respect to FIG. 2, the computation of the effective address and decoding of the effective address introduces some latency into accessing the cache 115. For example, in one embodiment the effective address can be determined in one phase of a clock cycle of a clock signal (not shown) supplied to the cache 115, and the determination of the decoded address takes an additional phase of the clock cycle. This latency provides time for the cache row targeted by a memory access operation to be prepared for access while the effective address is being decoded.

To illustrate, the cache 115 is a memory structure that stores data to be accessed by memory access operations. In particular, the cache 115 includes a plurality of bit cells arranged in rows and columns, wherein each row is associated with a different decoded address value. Accordingly, the bit cells of a particular row are accessed (read or written) by providing to the cache 115 a decoded address value indicative of the row. In an embodiment, the bit cells of the cache 115 can be placed into different power states, wherein the bit cells exhibit different behavior in each power state. For example, the bit cells can be placed in a low-power state wherein data stored at each bit cell is retained, but the data at the bit cells cannot be reliably accessed by memory access operations. Further, the bit cells can also be placed in an active state wherein the bit cells retain stored data and are accessible by memory access operations. Bit cells in the low-power state consume less power than bit cells in the active state. Accordingly, in order to prepare a row to be accessed, the row must be placed in an active state. The latency introduced by the computation and decoding of the effective address provides time for this transition. However, moving all of the rows of the cache 115 to the active state in response to each memory access operation can consume an undesirable amount of power. Accordingly, the processing unit 102 employs the speculative decode module 108 and the voltage control module 110 to selectively prepare only a subset of rows of the cache 115 for access in response to each memory access operation.

To illustrate, the speculative decode module 108 determines the subset of rows based on the base address and offset values associated with a memory operation. The speculative decode module 108 can determine the subset of rows more quickly than the effective address can be fully computed and decoded for the particular row to be accessed. However, the speculative decode module 108 cannot identify the particular row to be accessed by the memory access operation, but only the subset of rows that includes the particular row to be accessed.

To determine the subset of rows, the speculative decode module 108 performs a speculative decode operation. As used herein, a speculative decode operation refers to an operation that combines a portion of the base address and offset without performing a full addition of the portion of the base address and offset. As used herein, a full addition of the portion of the base address and offset is an addition that determines if there is a carry value resulting from addition of less significant bits than the bits included in the base address and offset portions and uses the carry value in the addition of the base address and offset portions. For example, in one embodiment the base address and offset portions correspond to bits 55-57 of a 64 bit base address and offset. Accordingly, a full addition of these portions would determine if there was any carry value resulting from the addition of bits 58-63 of the base address and offset and, if there is a carry value, include the carry value in the full addition of the base address and offset portions.

In one embodiment, the speculative decode module 108 performs the speculative decode operation by performing a PGZO operation on the base address and offset portions. The PGZO operation includes combining the portions according to a propagate function (P) corresponding to an exclusive-OR (XOR) operation, according to a generate function (G) corresponding to an AND operation, according to a zero function (Z) corresponding to a NOR operation, and according to a not-zero function (O) corresponding to an OR operation. The results of the PGZO operation are applied to a decoding matrix that indicates the subset of rows.

In another embodiment, the speculative decode module 108 computes two partial sums by adding a portion of the base address and a corresponding portion of the offset value. One of the partial sums, referred to as PS0, assumes that there is no carry resulting from the addition of less significant bits in the base address and offset values. The other partial sum, referred to as PS1, assumes that there is a carry value resulting from that addition. Thus, for example, where bits 52-57 of a 64 bit effective address are used for selecting 1 of 64 rows for access in a cache, the speculative decode module can sum bits 55-57 of the base address and the corresponding bits of the offset value for determining the subset of rows that includes the particular row to be accessed. Assuming, for purposes of example, that the bit values of the base address at positions 55-57 are 010 and the bit values of the offset value at positions 55-57 are 100, then PS0 is equal to 110 (the sum assuming that there would be no carry from the addition of the bits at position 58 and higher), and PS1 is equal to 111 (the sum assuming that there would be a carry from the addition of the bits at position 58 and higher). Accordingly, determination of the partial sums PS0 and PS1 is a speculative decode operation because it does not determine whether there is an actual carry resulting from the addition of the bits at position of 58 and higher, but rather assumes there is not a carry for the PS0 result, and assumes that there is a carry for the PS1 result. Therefore, because fewer bits are added (i.e. bits 55-57) and the actual carry in from bit 58 is ignored, the speculative decode of a subset of rows is faster than determining the actual row to be accessed which requires a full addition of bits 52-63.

Each of the partial sums PS0 and PS1 is address information identifying a corresponding row, or block of rows, at the cache 115. Because the partial sums PS0 and PS1 are based on the base address and offset, one of the rows identified by the partial sums will be the particular row accessed by the memory access operation. Accordingly, the partial sums PS0 and PS1 can be used to prepare the identified rows for access while the effective address is being decoded at the address decode module 112. This ensures that one of the rows that is prepared for access will be the particular row accessed by the memory access operation.

The voltage control module 110 is configured to control the power state of the rows of cache 115 based on the subset of rows indicated by the speculative decode module 108. In one embodiment, the power state of each bit cell is determined by the level of a voltage reference, $V_{DD}$, applied to the cell. Accordingly, the voltage control module 110 can, based on the control signaling, individually set the voltage reference for each row (or block of rows), at the cache 115 to set the power state for each row (or block of rows).

Figure 2:
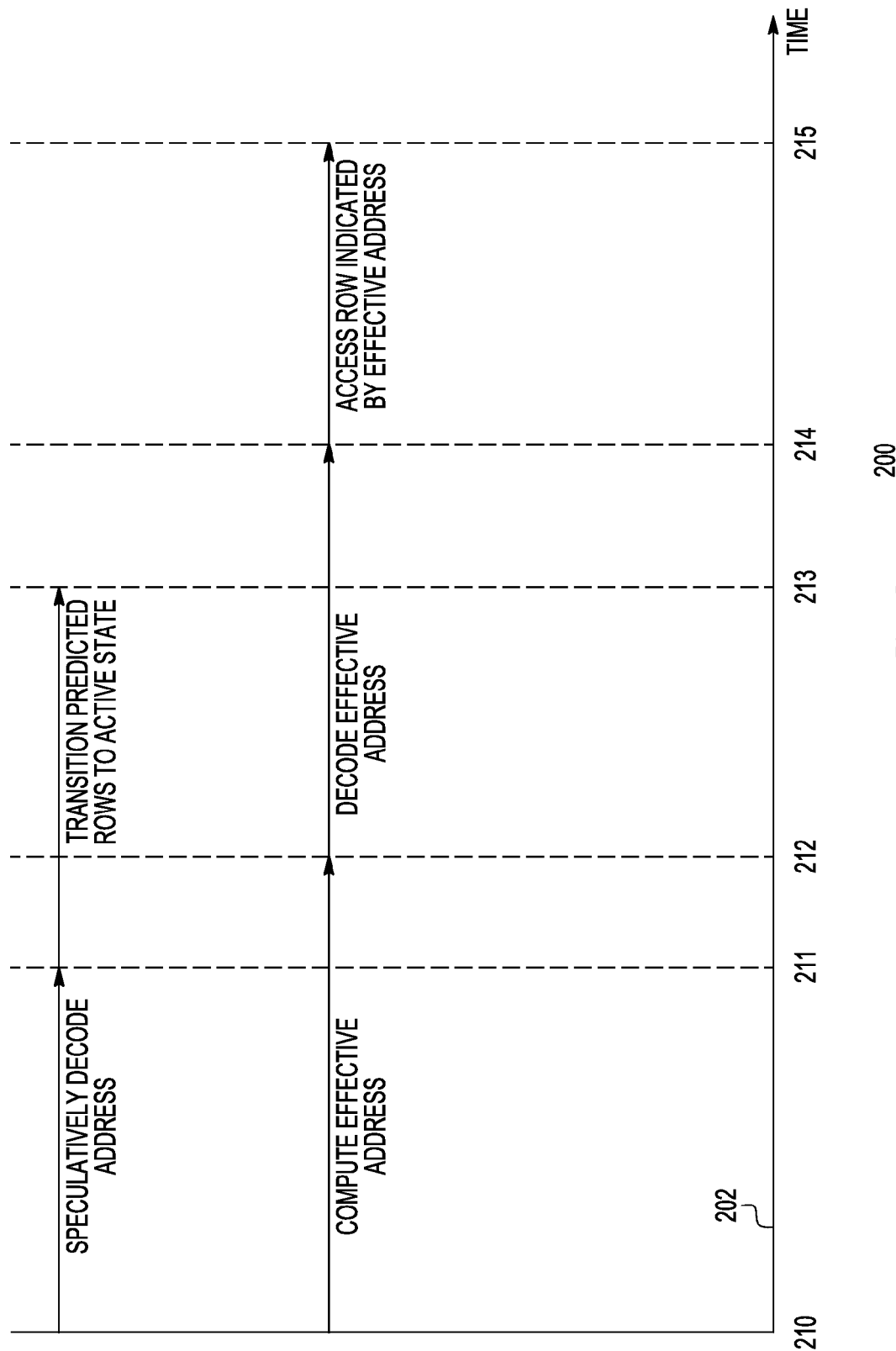
FIG. 2 is a diagram illustrating an access to the cache of FIG. 1 in accordance with one embodiment of the present disclosure.

FIG. 2 is a timing diagram 200 illustrating the timing of functions at the data processor 100 in accordance with one embodiment of the present disclosure. Axis 202 indicates time. At time 210, each of the rows of cache 115 is maintained in the low-power state. In addition, at time 210, a memory access operation is indicated by processing unit 102 storing base address and offset operands in address register 104. In response, between time 210 and 211, the speculative decode module 108 speculatively decodes the portions of the partial sum and base address to determine the subset of rows to be prepared for access. Between time 211 and 213, the voltage control module 110 receives the indication of the subset of rows from the partial decode module 108, and transitions the bit cells of those rows to the active state by changing the magnitude of the voltage $V_{DD}$ associated with each indicated row.

Between time 210 and 212 the effective address module 106 calculates the effective address. Between time 212 and 214, the address decode module 112 decodes the effective address. Between time 214 and 215 the row of cache 115 indicated by the effective address is accessed using the decoded address information.

Accordingly, in the illustrated embodiment, the indication of the subset of rows to be prepared is ready prior to the result of the effective address calculation because the speculative decode module does not perform a full addition to determine the effective address. This ensures that the rows are prepared for access by the time the decoded address information is ready at time 214. Accordingly the rows of the cache 115 can be maintained in the low-power state until they are to be accessed, without impacting cache latency.

Figure 3:
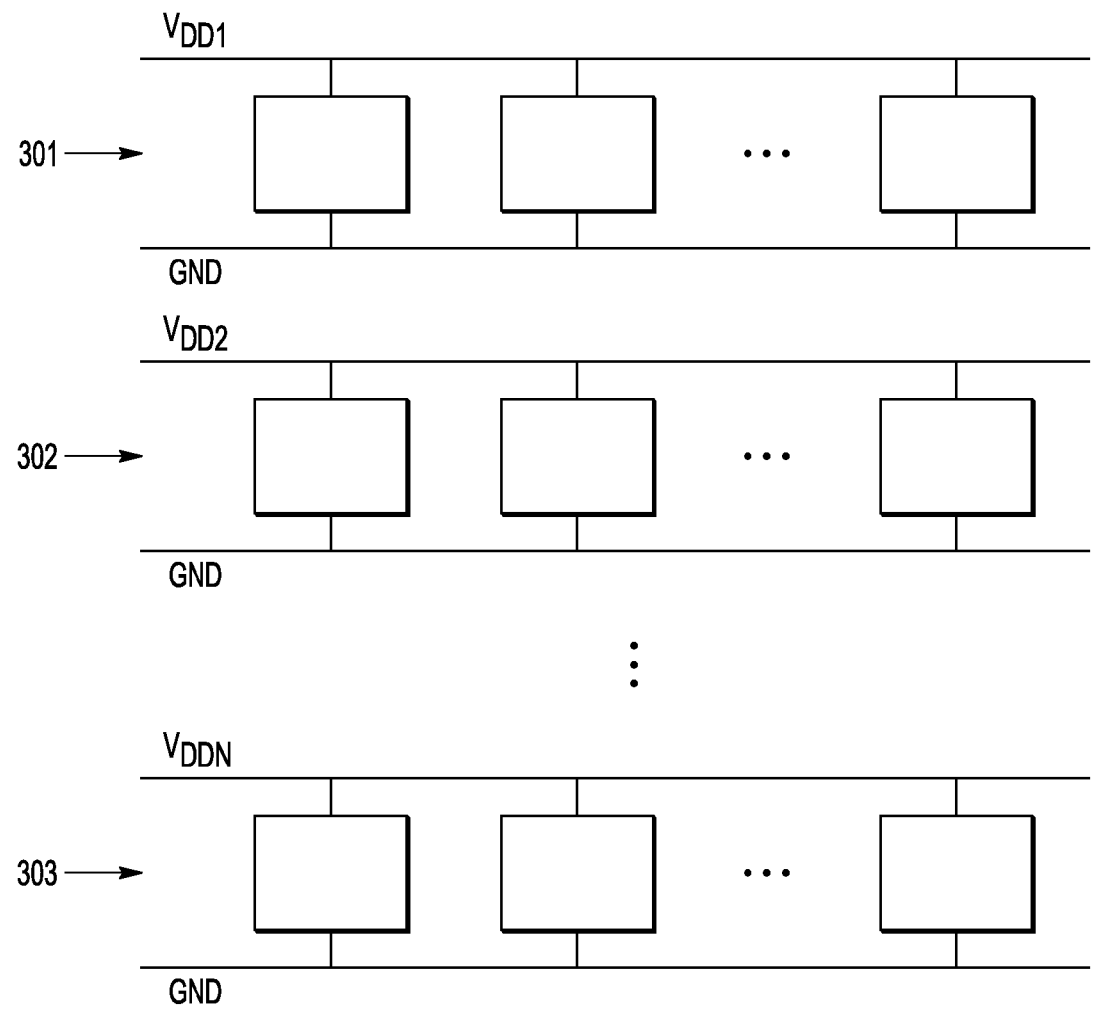
FIG. 3 is a block diagram of the cache of FIG. 1 in accordance with one embodiment of the present disclosure.

FIG. 3 illustrates a portion of a cache 315, corresponding to cache 115 in accordance with one embodiment of the present disclosure. The cache 315 includes N rows of bit cells, including rows 301, 302, and 303. Each of the N rows includes a plurality of bit cells connected between voltage references. For example, in the illustrated embodiment the bit cells of row 301 are connected between voltage reference $V_{DD1}$ and a ground (GND) voltage reference, the bit cells of row 302 are connected between voltage reference $V_{DD2}$ and the GND voltage reference, and the bit cells of row 303 are connected between voltage reference $V_{DDN}$ and a ground (GND) voltage reference. The difference between the voltages applied at the $V_{VDD(n)}$ and GND references determines the power state of the bit cells in a row. Thus, the difference between the voltages applied at the $V_{DD1}$ and the GND references determines the power state of the bit cells of row 301.

In operation, the voltage control module 110 can set the voltages applied at each of the $V_{VDD(n)}$ voltages individually. Accordingly, the voltage control module 110 can generally maintain each of the rows 301-303 in the low-power state. In response to receiving information from the speculative decode module 108 indicating that selected rows have the potential to be accessed by a received memory access operation, the voltage control module 110 transitions the indicated rows to the active state by changing the voltages applied to the associated VDD(n) references. After one of the rows has been accessed by the memory access operation, the voltage control module 110 returns the indicated rows to the low-power state by returning the VDD(n) references to the previous voltage.

To illustrate, in one example the voltage control module 110 maintains the bit cells of rows 301 and 302 in the low-power state by maintaining the voltages applied at the $V_{DD1}$ and $V_{DD2}$ references at a designated voltage (referred to as a retention voltage), such as 0.7 volts. In response to an indication from the partial sum module 108 that the bit cells of rows 301 and 302 may be accessed by a received memory access operation, the voltage control module 110 transitions the voltage applied at the $V_{DD1}$ and $V_{DD2}$ references to a different designated voltage (referred to as an active voltage), such as 1.1 volts. This places the bit cells of rows 301 and 302 in the active state, so that their stored data can be accessed via corresponding wordlines and bitlines (not shown). As illustrated with respect to FIG. 2, the voltage control module 110 receives the indication of rows 301 and 302 prior to address decoding, so that the voltage references $V_{DD1}$ and $V_{DD2}$ have reached the active voltage once address decoding is complete. After the row targeted by the memory access operation has been accessed, the voltage control module 110 returns the voltage references $V_{DD1}$ and $V_{DD2}$ to the retention voltage, thereby returning the bit cells of rows 301 and 302 to the retention state.

In another embodiment, the voltage control module 110 maintains the level of the VDD voltage references in all the power states, and changes the power state of a particular row by the voltage applied at the GND reference at that row. In still another embodiment, the voltage control module 110 can change the power state of a row by changing the voltage applied at the VDD voltage reference and changing the voltage at the GND voltage reference for the row.

Figure 4:
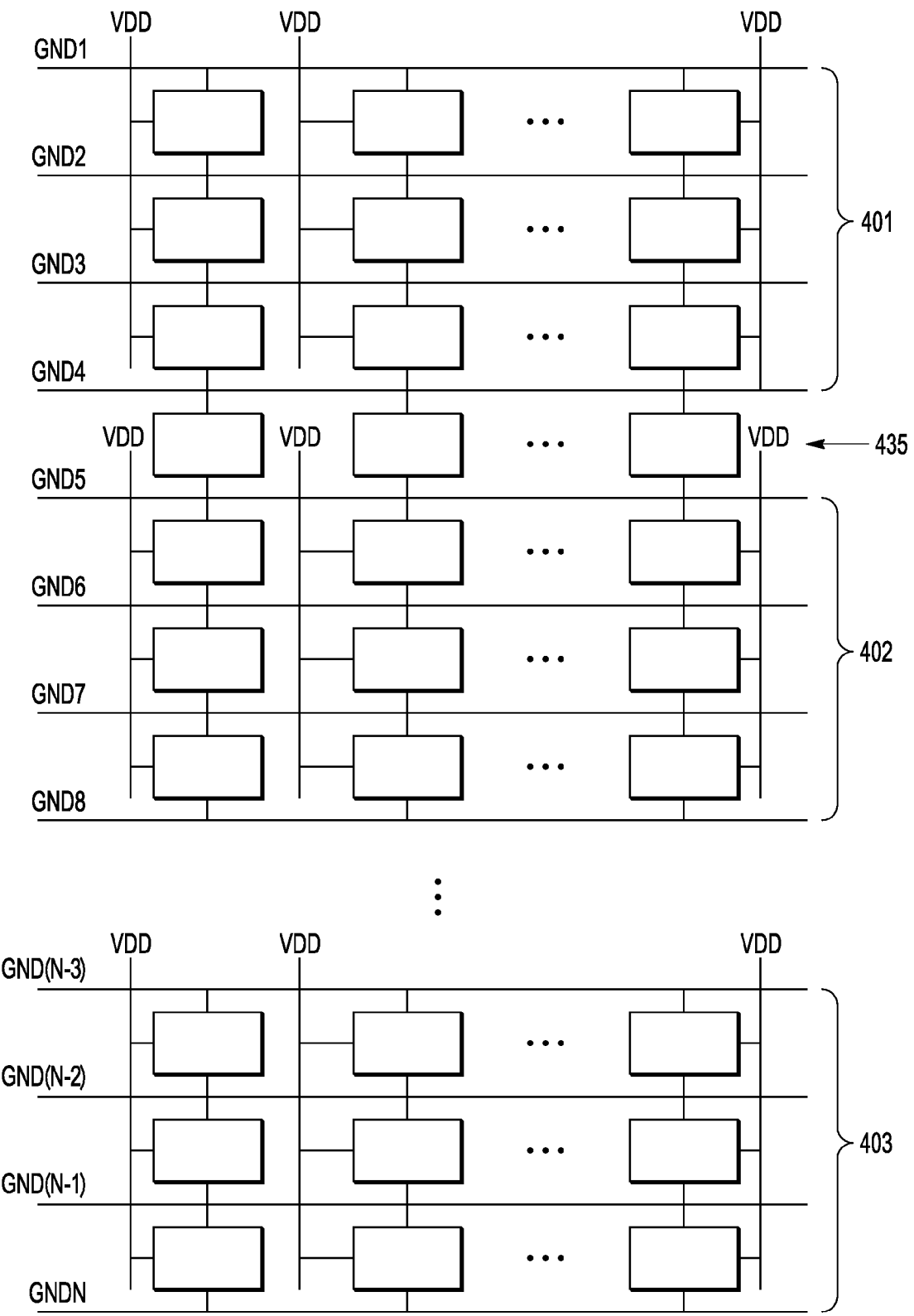
FIG. 4 is a block diagram of the cache of FIG. 1 in accordance with another embodiment of the present disclosure.

FIG. 4 illustrates a portion of a cache 415, corresponding to cache 115 in accordance with one embodiment of the present disclosure. The cache 415 includes N blocks, including blocks 401, 402, and 403, with each block including multiple rows of bit cells. Between each block is a dummy row used to provide separation between blocks having different power states as described further herein. For example between blocks 401 and 402 is a dummy row 435.

Each of the rows of a block is connected between settable ground (GND) voltage references, and is further connected to a fixed voltage reference labeled VDD. For example, in the illustrated embodiment, block 401 includes 3 rows of bit cells, the first row having bit cells connected between voltage references GND1 and GND2, the second row having bit cells connected between voltage references GND2 and GND3, and the third row having bit cells connected between voltage references GND3 and GND4. The difference between the voltage applied at the VDD and GND voltage references of a row determine the power state of the row's bit. Thus, the difference between the voltage applied at the VDD and GND1, GND2, GND3, GND4 voltage references determines the power state of the bit cells of the first row of block 401.

In operation, the voltage control module 110 can set the voltages applied at each of the $GND_{(n)}$ voltages individually. However, because each row of bit cells shares a voltage reference with an adjacent row, setting adjacent rows to different power states can result in undesirable behavior of the cache 415. For example, placing a row in the active state while attempting to maintain an adjacent row in the low-power state can cause data at the adjacent row to be lost. Accordingly, the voltage control module 110 sets the power states of the bit cells of the cache 115 on a block-by-block basis. The dummy rows between the blocks are not used to store data, but instead allow one block to be placed in an active state and an adjacent block to be maintained in the low-power state without loss of data.

For the embodiment of FIG. 4, the subset of rows determined at the speculative decode 108 will indicate multiple blocks that have the potential to be accessed by the memory access operation. Accordingly, in response to the memory access operation the voltage control module 110 transitions the blocks indicated by the speculative decode module 108 to the active state while maintaining the other blocks in the low-power state. After one of the rows of the active state blocks has been accessed by the memory access operation, the voltage control module 110 returns the blocks' rows to the low-power state.

To illustrate, in one example the voltage control module 110 maintains the bit cells of blocks 401 and 402 in the low-power state by maintaining the voltage applied between the VDD and GND1, GND2, GND3, GND4, GND5, GND6, GND7, and GND8 references at designated retention voltages. In response to an indication from the speculative decode module 108 that the bit cells of blocks 401 and 402 may be accessed by a received memory access operation, the voltage control module 110 transitions the voltage applied at the GND references to different designated active voltages. This places the bit cells of blocks 401 and 402 in the active state, so that their stored data can be accessed via corresponding wordlines and bitlines (not shown). After the row targeted by the memory access operation has been accessed, the voltage control module 110 returns the GND voltage references of blocks 401 and 402 to the retention voltage, thereby returning the bit cells of blocks 401 and 402 to the retention state.

In an alternate embodiment of FIG. 4, each row in blocks 401, 402 and 403 shares fixed GND voltage references with the adjacent rows and has a settable common VDD reference for each column in blocks 401, 402 and 403. The voltage control module 110 transitions the voltage applied at the VDD reference to different designated active voltages. In a yet another embodiment of FIG. 4, each row in blocks 401, 402 and 403 shares VDD voltage references with the adjacent rows and has a common GND reference for each column in blocks 401, 402 and 403. The voltage control module 110 can transition either the common GND reference or the shared VDD voltage reference to change the power state of the bit cell from one power state to another power state.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

As used herein, the term "first" can refer to any selected item, and does not necessarily refer to first in time or first in a particular order. Thus, for example, the term "first checkbit" can refer to any one of a set of checkbits, and does not refer to the placement of a checkbit in time or order.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   performing a speculative decode operation based on a base address and an offset to determine speculative decode information;
   raising a voltage across bit cells of a plurality of cache rows of a cache memory array from a first voltage to a second voltage for access based on the speculative decode information, wherein the plurality of cache rows is less than all of the cache rows of the cache memory array; and
   concurrent with determining the speculative decode information and preparing the plurality of cache rows, selecting a cache row of the plurality of cache rows prepared for access based on the base address and the offset,
   wherein the cache memory array includes a first set of cache rows coupled to a first voltage reference and a second voltage reference and a second set of cache rows adjacent to the first set of cache rows and coupled to the second voltage reference and a third voltage reference.

2. The method of claim 1, wherein the performing the speculative decode operation comprises combining a portion of the base address and a portion of the offset according to an exclusive-OR operation.

3. The method of claim 2, wherein performing the speculative decode operation comprises combining the portion of the base address and the portion of the offset according an AND operation.

4. The method of claim 1, wherein performing the speculative decode operation comprises:
   determining a partial sum by adding a portion of the base address and a portion of the offset without incorporating a potential carry resulting from the addition of the next-least significant bit of the portion of the base address and the next-least significant bit of the offset; and
   determining the plurality of cache rows based on the partial sum without performing a full addition of the portion of the base address and the portion of the offset.

5. The method of claim 1, wherein the plurality of cache rows includes a first set of cache rows coupled to a first voltage reference and a second voltage reference and a second set of cache rows adjacent to the first set of cache rows and coupled to the second voltage reference and a third voltage reference.

6. The method of claim 5, wherein the first set of cache rows includes multiple cache rows each coupled to the first voltage reference and the second voltage reference and the second set of cache rows includes multiple cache rows each coupled to the second voltage reference and the third voltage reference.

7. The method of claim 1, wherein selecting the cache row comprises determining a sum based on the base address and the offset.

8. The method of claim 7, wherein selecting the cache row comprises decoding the sum.

9. The method of claim 1, wherein determining the speculative decode information comprises determining a plurality of partial sums which comprises determining a first partial sum to include a carry value and determining a second partial sum to omit the carry value.

10. A method, comprising:
    performing a speculative decode operation based on a first portion of a base address and an offset to determine speculative decode information, the first portion less than all of the base address;
    determining an effective address based on a second portion of the base address and the offset;
    raising a voltage across bit cells of a plurality of rows of a cache memory array from a first voltage to a second voltage for access based on the speculative decode operation, wherein the plurality of cache rows includes a first set of cache rows coupled to a first voltage reference and a second voltage reference and a second set of cache rows adjacent to the first set of cache rows and coupled to the second voltage reference and a third voltage reference, and wherein the plurality of rows is less than all of the rows of the cache memory array; and
    decoding the effective address, the effective address indicating a row of the cache memory array located in the plurality of rows.

11. The method of claim 10, wherein the second portion of the base address is more than the first portion of the base address.

12. The method of claim 10, wherein the first set of cache rows includes multiple cache rows each coupled to the first voltage reference and the second voltage reference and the second set of cache rows includes multiple cache rows each coupled to the second voltage reference and the third voltage reference.

13. A device, comprising:
    a cache memory array comprising a plurality of bit cells arranged in a plurality of cache rows and columns;
    a speculative decode module to perform a speculative decode operation based on a base address and an offset;

a voltage control module to selectively raise a voltage across bit cells of at least first and second cache rows of the plurality of cache rows from a first voltage to a second voltage based on the speculative decode operation, while maintaining a voltage across cells of other cache rows of the plurality of cache rows at the first voltage, wherein the plurality of cache rows includes a first set of cache rows coupled to a first voltage reference and a second voltage reference and a second set of cache rows adjacent to the first set of cache rows and coupled to the second voltage reference and a third voltage reference; and a decode module to, concurrent with the voltage control module activating the at least first and second cache rows, decode an effective address to determine a decoded address indicative of one of the first cache row and the second cache row.

14. The device of claim 13, wherein the voltage control module sets a plurality of voltage references to transition a first block of rows and a second block of rows from a low-power state to an active state, each of the block of rows including more than one row.

15. The device of claim 13, wherein the speculative decode module is to combine less than all of the base address and less than all of the offset according to an exclusive-OR operation.

16. The device of claim 13, wherein the speculative decode module is to:

determine a partial sum by adding less than all of the base address and less than all of the offset without incorporating a potential carry resulting from the addition of the next-least significant bit of the portion of the base address and the next-least significant bit of the offset; and determining the plurality of cache rows based on the partial sum without performing a full addition of the portion of the base address and the portion of the offset.

17. The device of claim 13, further comprising an effective address module to determine the effective address concurrent with the speculative decode module performing the speculative decode operation.

18. The device of claim 13, wherein the first set of cache rows includes multiple cache rows each coupled to the first voltage reference and the second voltage reference and the second set of cache rows includes multiple cache rows each coupled to the second voltage reference and the third voltage reference.

* * * * *